United States Patent [19]

Mason

[11] 4,316,099
[45] Feb. 16, 1982

[54] PERMANENT MAGNET STATOR FOR D.C. MOTORS

[76] Inventor: Elmer B. Mason, 901 Vickie Dr., Del City, Okla. 73115

[21] Appl. No.: 171,502

[22] Filed: Jul. 21, 1980

Related U.S. Application Data

[63] Continuation-in-part of Ser. No. 2,262, Jan. 10, 1979, Pat. No. 4,221,984.

[51] Int. Cl.³ .............................................. H02K 23/04
[52] U.S. Cl. ................................................... 310/154
[58] Field of Search ............................... 310/152–156, 310/126

[56] References Cited

U.S. PATENT DOCUMENTS

| | | |
|---|---|---|
| 374,959 | 12/1887 | Gray . |
| 3,723,796 | 3/1973 | Mason ................................. 310/126 |
| 3,757,149 | 9/1973 | Holper ................................. 310/114 |
| 3,828,213 | 8/1974 | Yamashita et al. ............. 310/154 X |

FOREIGN PATENT DOCUMENTS 487529  4/1970  Switzerland .

Primary Examiner—Donovan F. Duggan
Attorney, Agent, or Firm—Robert K. Rhea

[57] ABSTRACT

In a high starting torque D.C. magnetic motor the back e.m.f. is greatly reduced by reducing the area of magnetic flux acting on the rotor to an arc of the rotor circumference spanning the number of the rotor segments spanned by the respective rotor brush contacting the cooperating commutator segments. At least one rotor is coaxially supported adjacent and in axial alignment with coaxial apertures in parallel spaced-apart nonmagnetic end plates. A plurality of equally spaced elongated permanent magnets, connected with the respective end plate, extend parallel with the axis of the rotor and in close spaced relation with respect to circumferential portions of its periphery.

3 Claims, 11 Drawing Figures

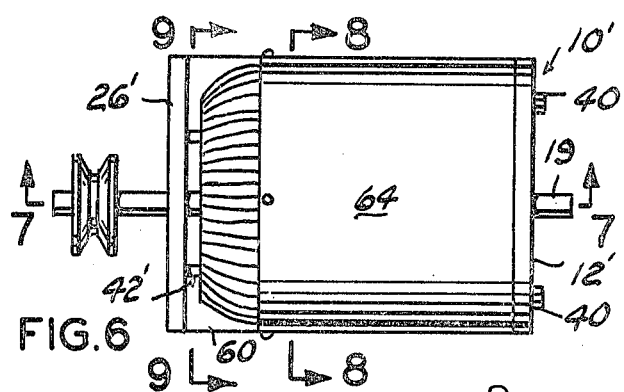
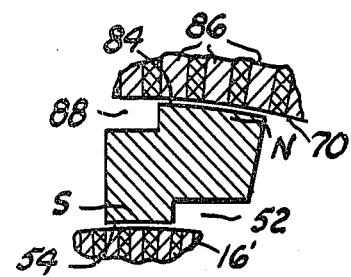
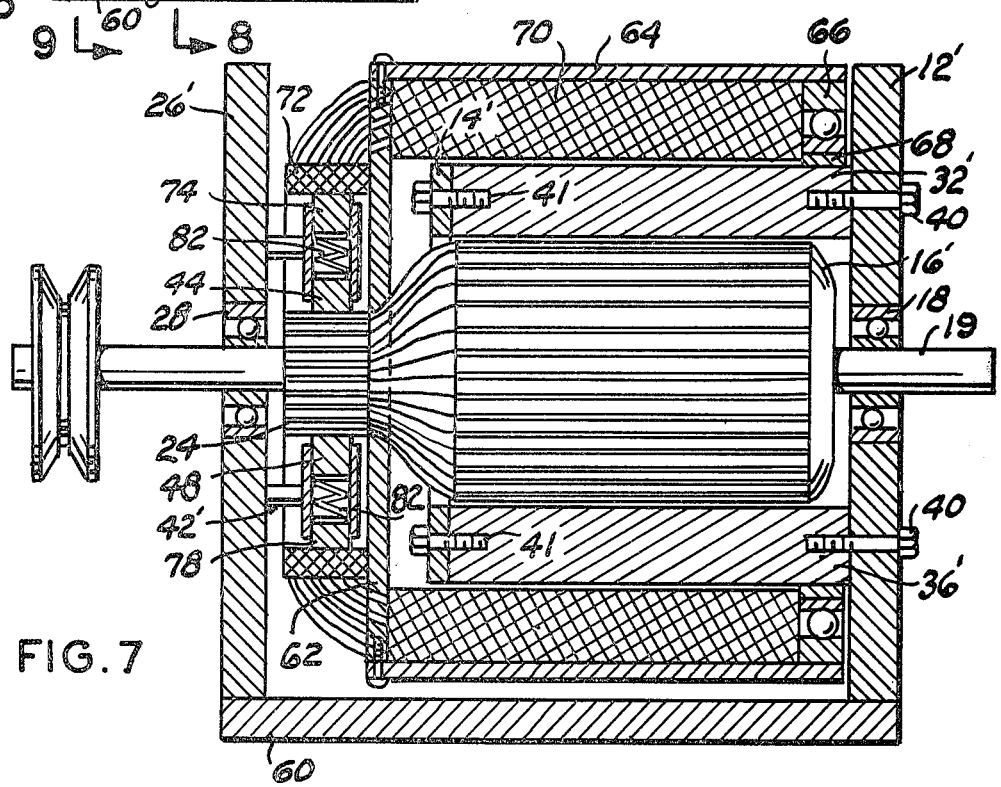
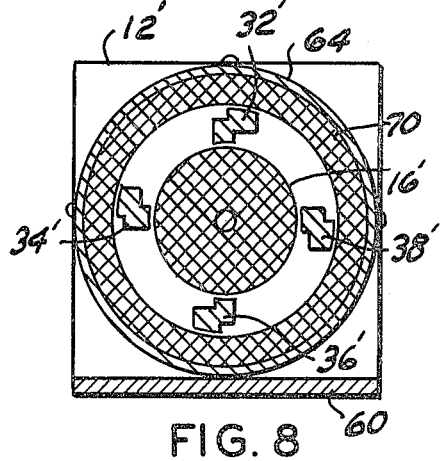
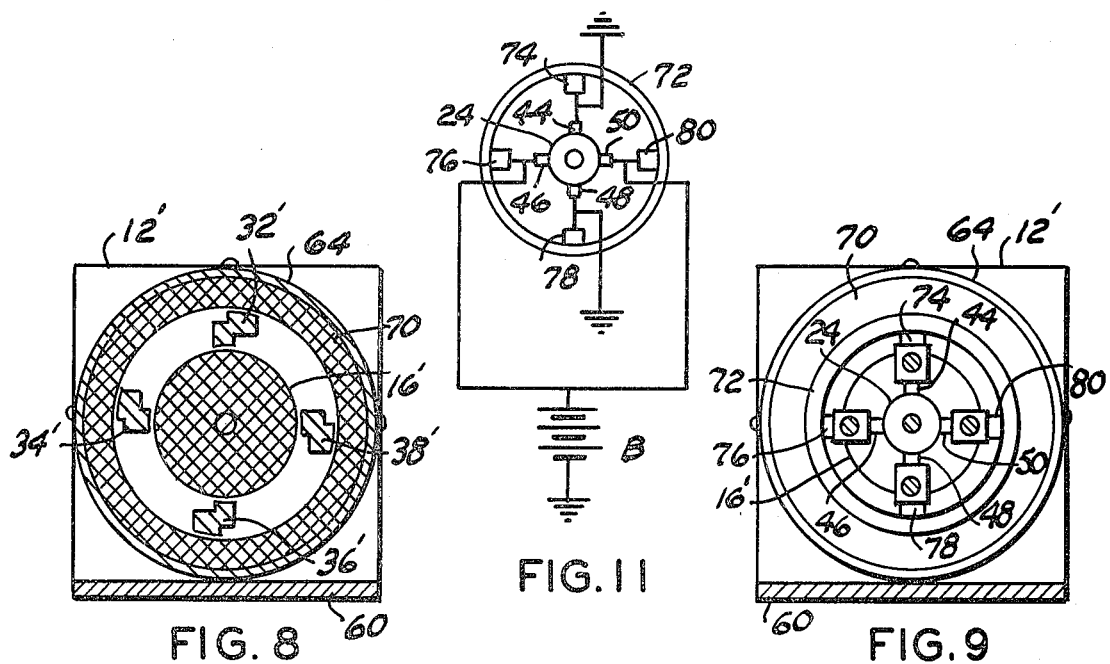
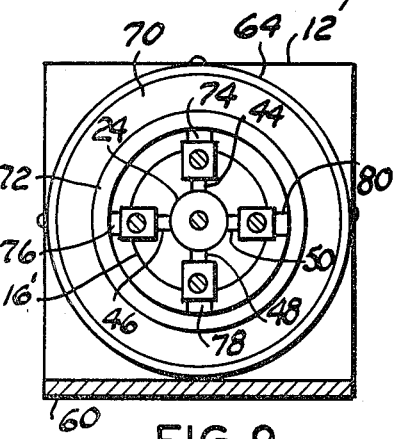

PERMANENT MAGNET STATOR FOR D.C. MOTORS

This application is a continuation-in-part of application Ser. No. 2,262, filed Jan. 10, 1979, now U.S. Pat. No. 4,221,984 dated Sept. 9, 1980.

BACKGROUND OF THE INVENTION

1. Field of the Invention

The present invention relates to direct current motors and more particularly to a magnetic motor.

A direct current motor constructed in accordance with this invention finds particular application in industry where a high torque direct current motor, having an exceptionally high starting torque, is needed. For example, for starting the Diesel engine of a relatively large size truck-tractor commonly referred to as a "big cam Diesel". The engines of these truck-tractors are usually left running in cold weather when the truck-tractor rig is parked out-of-doors for the reason that when the motor and motor oil becomes cold the engine cannot be turned over or started with any presently available starter. This results in an unnecessary waste of Diesel fuel as well as wearing the engine. Further, a direct current motor of this type is needed for mounting on the "dead" axle of a truck-tractor to assist the internal combustion engine on long uphill grades.

2. Description of the Prior Art

The most pertinent prior patents are believed to be U.S. Pat. Nos. 374,959; 3,757,149; Switzerland Pat. No. 487,529 4/70 and my U.S. Pat. No. 3,723,796. These patents generally disclose motors having the axes of the armatures arranged in parallel normal to the axis of a coil or coils as in U.S. Pat. No. 3,757,149 or parallel with the coil axis as in U.S. Pat. Nos. 487,529; 374,959 and 3,723,796, featuring coil energized magnetic pole pieces surrounding diametrically opposite substantial portions of the respective armature periphery. This partial armature wrap-around feature of the magnetic pole pieces resulting in a back electromotive force (e.m.f.) opposing the magnetic attractive e.m.f. on the armature winding thus reducing the efficiency of the motor and reducing its torque.

In the present invention the back e.m.f. is eliminated by reducing the area of magnetic flux acting on the rotor to an arc of the rotor circumference spanning the number of the rotor segments spanned by the respective rotor brush contacting the cooperating commutator segments. This results in forming a motor which has a substantially increased torque when compared with a conventional similar size or rated A.C. or D.C. motor having the major portion of its rotor periphery spanned by magnetic pole pieces or conventional field coils.

Other direct current high torque motors presently in use are generally characterized by the disadvantage of a relatively high amperage drag. This feature is particularly undesirable where, for example, the motor is utilized as the prime mover of a vehicle and has a constant amperage drag at a constant voltage whether climbing, cruising or coasting downhill. This invention provides a motor having an amperage drag in proportion to the load and in which the amperage drag is automatically reduced when a cruising speed is reached and is further reduced to a minimum under little or no load.

SUMMARY OF THE INVENTION

In one embodiment, a rotor is supported between a pair of parallel spaced-apart nonmagnetic end plates. A plurality of elongated permanent magnets extend between and are connected with the respective end plate in circumferential equally spaced relation about the periphery of the rotor parallel with its axis and in close spaced relation with respect to its periphery. That portion of each elongated magnet adjacent the periphery of the rotor is limited to a width no greater than the transverse dimension of any three segments forming the rotor winding. The magnets establish magnetic flux circuits for the rotor.

In another embodiment a hollow rotor coaxially surrounds an inner rotor and its energizing permanent magnets. One end portion of the outer rotor is supported by a bearing surrounding the circular array of permanent magnets and its other end is supported by a disk secured to the axle of the inner rotor. A hollow commutator, supported by the disk coaxially loosely surrounds the inner rotor and is contacted on its inner periphery by brushes supported by the brush mount for the inner rotor commutator. The permanent magnets energizing the inner rotor also energize the outer rotor.

The principal object of this invention is to provide a direct current motor having at least one rotor utilizing the magnetic flux of a plurality of permanent magnets disposed in spaced-apart parallel relation with respect to the longitudinal axis of the rotor for providing high torque and cool running characteristics.

BRIEF DESCRIPTION OF THE DRAWINGS

FIG. 6 is a top view of another embodiment of the motor;

FIG. 7 is a vertical cross sectional view, to a larger scale, taken substantially along the line 7—7 of FIG. 6;

FIG. 8 is a vertical cross sectional view taken substantially along the line 8—8 of FIG. 6;

FIG. 9 is a vertical cross sectional view, partially in elevation, taken substantially along the line 9—9 of FIG. 6;

FIG. 10 is a fragmentary cross sectional view, to an enlarged scale, illustrating the transverse magnetic flux area between one of the permanent magnets with respect to the respective rotor winding segments; and, FIG. 11 is a wiring schematic.

DESCRIPTION OF THE PREFERRED EMBODIMENTS

Figure 1:
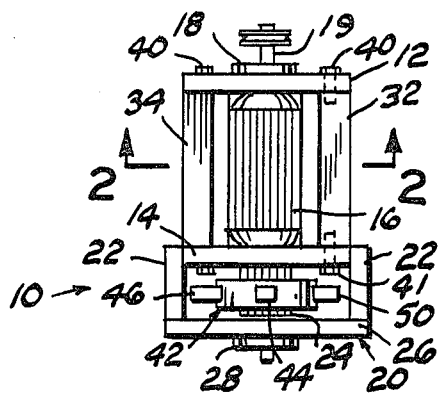
FIG. 1 is a top view of one embodiment of the motor.

Like characters of reference designate like parts in those figures of the drawings in which they occur.

In the drawings:

Referring more particularly to FIGS. 1 to 5, the reference numeral 10 indicates one embodiment of the motor which is rectangular in general configuration comprising a pair of generally rectangular identical nonmagnetic material end plates 12 and 14 disposed in parallel spaced-apart relation for supporting an armature or rotor 16 having longitudinally extending segments. The end plate 12 is centrally apertured and provided with a bearing 18 for supporting one pulley equipped end portion of the rotor axle 19. The other end plate 14 is similarly apertured and loosely surrounds the commutator end portion of the rotor. Brush mount supporting means 20 is connected with the end plate 14 and includes a pair of nonmagnetic material side walls 22 secured to opposing side edges of the end plate 14 parallel with the commutator 24. The side walls are joined by an end wall 26 having an aperture supporting a bearing 28 journalling the commutator end portion of the rotor axle 19.

A plurality, four in the example shown, of elongated permanent magnets 32, 34, 36 and 38, extend between and are connected at their respective ends to the end plates 12 and 14 in circumferential equally spaced relation around the perimeter of the rotor 16.

The magnets 32-38 are at least coextensive with the winding segments of the rotor 16 and are rigidly connected with the end plates 12 and 14, during assembly of the motor, by a plurality of bolts or screws 40 and 41, for the purpose of maintaining the respective magnet parallel with the axis of the rotor.

A brush mount 42, containing a plurality, four in the example shown, of circumferentially spaced brushes 44, 46, 48 and 50, surrounds the commutator 24 of the rotor.

Figure 2:
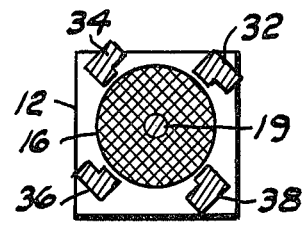
FIG. 2 is a vertical cross sectional view taken substantially along the line 2—2 of FIG. 1.
Figure 3:
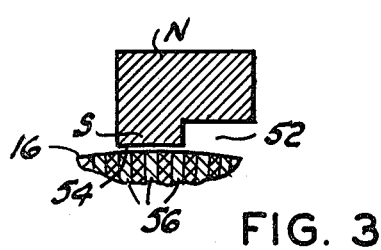
FIG. 3 is a fragmentary cross sectional view, to an enlarged scale, illustrating the transverse magnetic flux area between one of the permanent magnets with respect to the rotor winding segments.
Figure 4:
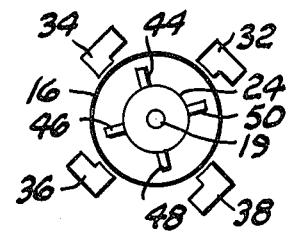
FIG. 4 is an end view similar to FIG. 2 illustrating the relative position of the commutator brushes with respect to the position of the permanent magnets.

The magnets are formed from elongated generally rectangular, in transverse section, bar stock preferably containing Cobalt to reduce magnetic loss as a result of overheating to a minimum. The bar stock is magnetized in a conventional manner as by placing one longitudinal flat surface in contiguous contact with an electromagnet, not shown, so that when the bar is removed from the electromagnet the resulting permanent magnet has opposing longitudinally extending North and South poles (FIG. 3) as opposed to North and South poles at its respective ends. As illustrated by FIGS. 2, 3 and 4, the permanent magnets 32-38 are formed to define a longitudinally coextensive rabbetted edge or recess 52 having a transverse width substantially equal to one-half the width of the magnet and a selected vertical depth, as viewed in FIG. 3, as presently explained.

The pair of magnets 32-36 are disposed with their longitudinal South poles facing the perimeter of the rotor 16 and the other pair of magnets 34-38 are disposed with their longitudinal North poles facing the rotor.

As illustrated by FIG. 3, the transverse width of the respective permanent magnet surface 54 facing the winding of the rotor is no greater than the transverse dimension spanning any three segments 56 of a span seven rotor. This dimension is cooperatively related to the number of commutator segments spanned by the respective brush. Stated another way, the number of rotor winding segments 56 transversely spanned by each permanent magnet is equal to the number of commutator segments spanned by the respective brush. The magnet surface 54 is arcuately curved transversely, complemental with the periphery of the rotor 16.

The purpose of the rabbetted edge 52 is to eliminate the rotational opposing magnetic force normally present in the removed lower right hand corner portion of the magnet, as viewed in FIG. 3, thus fully utilizing all the magnetic attractive force in the lower left hand portion of the magnet.

The spacing between the magnet surface 54 and the adjacent surfaces of the commutator segments 56 is preferably 0.020 inch (0.0508 cm) and the vertical depth of the rabbetted edge is approximately $\frac{1}{4}$ inch (0.635 cm) or approximately $12\frac{1}{2}$ times the spacing between the magnet and rotor.

Figure 5:
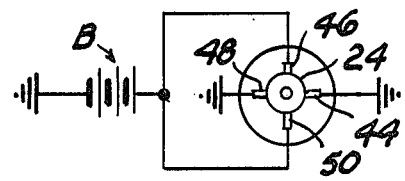
FIG. 5 is a wiring schematic of the motor of FIG. 1.

As illustrated by FIG. 5, the battery B positive terminal is connected in parallel to diametrically opposite brushes 46 and 50. The other two brushes 44 and 48 are connected to ground.

Controls, not shown, may be incorporated to advance or retard the position of the respective brushes with respect to the position of the magnets for increasing or decreasing the angular rate of rotation of the rotor.

Referring more particularly to FIGS. 6 through 11, the reference numeral 10' indicates another embodiment of the motor in which identical parts bear the same reference numerals and modified parts bear prime reference numerals. The nonmagnetic end plate 12' is enlarged and supported by a base 60 underlying the motor. The end plate 12' is equipped with the bearing 18 journalling one end portion of the axle 19 of the rotor 16', hereinafter called inner rotor. The end wall 26' is similarly enlarged and equipped with the bearing 28 for journalling the commutator end portion of the rotor axle 19. The permanent magnets 32', 34', 36' and 38' are similarly disposed in circumferentially spaced relation longitudinally of the rotor 16' and connected at one end portion with the end plate 12'. The nonmagnetic end plate 14', diametrically equal with the circumference describing the outward limit of the several magnets and similarly loosely surrounding the rotor 16', is similarly connected with the other end of the respective magnets.

A disk 62 surrounds and is secured to the inner rotor axle 19 between the commutator 24 and the inner rotor windings for angular rotation with the inner rotor 16'. The periphery of the disk 62 is connected with one end portion of a sleeve 64 loosely surrounding the inner rotor 16' and circular array of the several magnets 32'-38'. The other end portion of the sleeve 64 is journalled by a bearing 66 surrounding the several magnets 32'-38'. A nonmagnetic ring 68 is interposed between the bearing 66 and the magnets. A hollow outer rotor 70, of predetermined thickness, having longitudinally extending segments, is disposed on the inner surface of the sleeve 64 between the disk 62 and bearing 66. A hollow commutator 72 is secured to the face of the disk 62 opposite the outer rotor 70 and loosely coaxially surrounds the inner rotor commutator 24. The pairs of wires extending between the respective commutator and rotor windings pass through a like plurality of apertures in the disk 62.

The brush mount 42', supported by the end wall 26', is modified to support a second set of four brushes 74, 76, 78 and 80 respectively axially aligned with the inner rotor commutator brushes 44, 46, 48 and 50 and contacting the inner periphery of the commutator 72, the respective pairs of brushes being urged in opposite directions for contact with the respective commutator by springs 82.

As illustrated by FIGS. 8 and 10, the magnets 32'-38' are modified with respect to the configuration of the magnets 32-38 by forming a transverse arcuate curve 84 on its longitudinal surface opposite the inner rotor 16' complemental with the inside periphery of the outer rotor 70. The transverse width of the magnet surface 84 is such that it spans any three segments 86 of the outer rotor 70. It being understood that the two rotors 16' and 70 are wound identically, that is, if the inner rotor 16' is a span seven rotor then the outer rotor 70 is also a span seven rotor. The magnet surface 84 is thus of greater transverse width than the magnet surface 54 to compensate for the increased width of the outer rotor windings. Each of the magnets 32'-38' are similarly provided with a rabbetted edge or space 88 diagonally opposite the rabbetted edge 52 for the reasons previously explained.

As illustrated by FIG. 11, the battery B positive terminal is connected in parallel to diametrically opposite pairs of brushes 46-76 and 50-80. The other two pairs of brushes 44-74 and 48-78 being grounded.

Obviously the invention is susceptible to changes or alterations without defeating its practicability. Therefore, I do not wish to be confined to the preferred embodiment shown in the drawings and described herein.

I claim:

1. A motor assembly, comprising:

magnetic motor support means including a pair of nonmagnetic spaced-apart plates having coaxial bearing equipped central apertures;

at least one rotor journalled by said bearings, said rotor being characterized by a winding having a plurality of axially extending segments and a commutator having a like plurailty of segments and including a pair of commutator brushes each transversely spanning a plurality of commutator segments; and, magnetic field producing means including at least one pair of opposing permanent magnets connected with at least one said plate, normal to the plane thereof, and projecting toward the opposite said plate parallel with the rotor axis for establishing a magnetic flux circuit across said rotor, each said magnet being characterized by a transverse surface facing the winding segments of the rotor, the transverse dimension of said transverse surface being no greater than the transverse dimension of a plurality of rotor winding segments equal in number to the number of commutator segments spanned by the respective brush.

2. The motor according to claim 1 and further including:

a second rotor concentric and angularly rotatable with said one rotor as a unit and defining an annular space therebetween nesting one end portion of said pair of magnets, said second rotor being characterized by a winding having a plurality of axially extending segments and a commutator having a like plurality of segments and including a second pair of commutator brushes each transversely spanning a plurality of the second rotor commutator segments, each said magnet being further characterized by a second transverse surface facing the winding segments of the second rotor, the transverse dimension of said second transverse surface being no greater than the transverse dimension of a plurality of the second rotor winding segments equal in number to the number of commutator segments spanned by the respective brush of said second pair of brushes.

3. The motor according to claim 1 or 2 in which each said magnet is characterized by a coextensive rabbetted edge facing the rotor winding segments.

* * * * *